Oct. 10, 1961

C. W. DEVINO 3,004,239

BATTERY SAFETY CLAMP

Filed Sept. 9, 1960

INVENTOR.

Charles W. Devino

3,004,239
BATTERY SAFETY CLAMP
Charles W. Devino, 707 Highland Ave., Waterbury, Conn.
Filed Sept. 9, 1960, Ser. No. 54,911
1 Claim. (Cl. 339—226)

The present invention relates to storage batteries for automotive vehicles generally and in particular to a safety clamp for a storage battery.

In the automotive repair business it is frequently desirable to attach a cable to a battery for either temporary or permanent use. Many devices have been proposed in the past but few of them have been successful, such devices usually requiring the employment of a tool for attaching the temporary clamp to the battery terminal.

An object of the present invention is to provide a clamp for a battery terminal of an automotive vehicle which is simple in structure, one which is highly effective in action, one which requires no tools to apply or to disengage from the battery terminal, and one which may be manufactured in quantity at reasonable cost.

Figure 1:
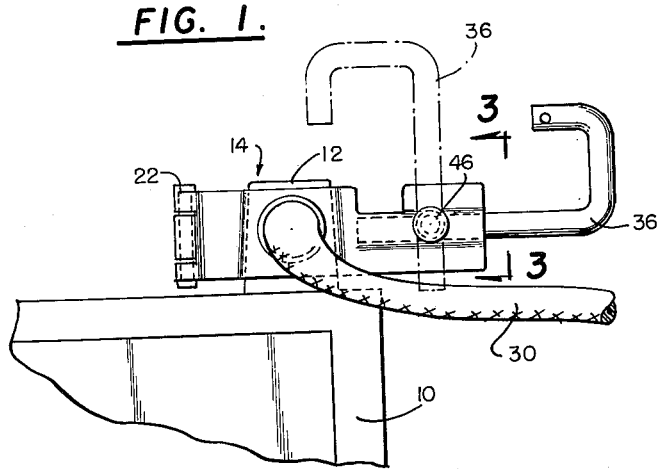
Figure 2:
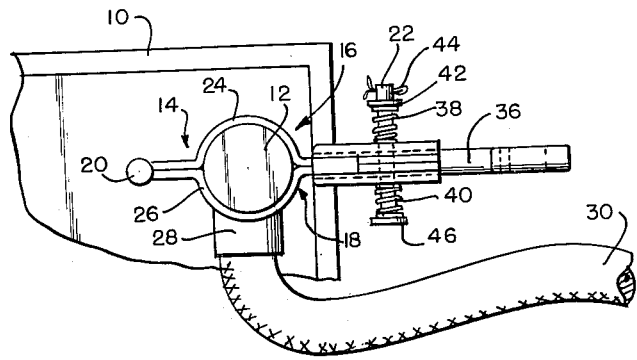
Figure 3:
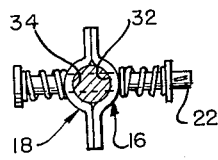
Figure 4:
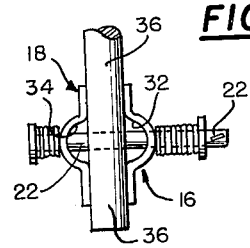

These and other objects and advantages of the present invention will be fully apparent from the following description when taken in conjunction with the annexed drawing, in which:

FIGURE 1 is an elevational view of an upper corner of an automotive storage battery, showing one terminal thereof, with the clamp of the present invention installed thereon, the dotted line showing a portion of the clamp indicating the release position, FIGURE 2 is a top plan view of the assembly shown in FIGURE 1, FIGURE 3 is a view taken on line 3—3 of FIGURE 1, and FIGURE 4 is a view of the assembly shown in FIGURE 3, in the release position.

With reference to the drawing in which like numerals indicate like parts throughout the several views, a reference numeral 10 designates a storage battery commonly in use in automotive vehicles and the numeral 12 designates one of the terminals of the battery 10.

The device of the present invention is designated generally by the reference numeral 14 and it comprises a pair of identical clamp sections 16 and 18 having their one adjacent ends connected together by a vertically disposed hinge pin 20 and having portions adjacent their other ends provided with aligned holes through which extends a connecting pin element 22.

The clamp sections 16 and 18 have outwardly bowed jaw portions 24 and 26, respectively, disposed in face to face confronting relation and each of a semi-cylindrical configuration. The jaw portions are in alignment with each other and when in the face-to-face confronting position are of a size to accommodate the terminal 12 in such a manner as to provide good electrical connection therebetween.

Projecting perpendicularly from the jaw portion 26 is a socket 28 in which is electrically connected one end of a power cable 30.

The portions of the clamp sections 16 and 18 remote from the hinge pin 20 are provided with longitudinally extending semi-circular recesses 32 and 34 respectively, as shown most clearly in FIGURES 3 and 4. The recesses 32 and 34 extend longitudinally of the clamp sections 16 and 18 and provide, when they are together, a bore for an operating lever 36. The operating lever 36 is provided with a bore through which extends the pin element 22, connecting the pin element 22, the lever 36, and the clamp sections 16 and 18 for movement of the lever 36 about the pin element 22 as a horizontal axis.

A pair of springs 38 and 40, coil shaped in form, are circumposed about the portions of the pin element 22 exteriorly of the clamp sections 16 and 18 respectively, and have their one ends bearing against the clamp sections 16 and 18 and their other ends bearing against a washer 42 secured on the portion of the pin 22 adjacent the clamp element 16 by means of a cotter pin 44, and a head 46 on the other end of the pin 22, respectively.

The springs 38 and 40 are normally under compression and hold the sides of the clamp 16 and 18 against the adjacent part of the lever 36.

The lever 36 is shiftable from the full line position shown in FIGURE 1 to the dotted line position. This results in spreading apart of the clamp elements 16 and 18 from the position shown in FIGURE 3 to the position shown in FIGURE 4. This spreading apart of clamp element 16 and 18 permits the release of the device 14 from the terminal 12 with ease and facility and at any time it is desired to detach the device 14 from the terminal 12. It also permits the attachment of the device 14 to the terminal 12 with a minimum of effort and therefore it is seen that the device 14 of the present invention provides an easily attached electrical connection for the terminal 12, it being understood that the other end of the power cable 30 can be extended to a point where electrical power is needed.

What is claimed is:

A battery clamp comprising a pair of clamp sections arranged in face-to-face confronting relation and having their one ends hingedly connected together by a pivot pin, each of said clamp sections having a semi-circular jaw portion, the jaw portions being in face-to-face confronting relation and adapted to secure therebetween a terminal of a storage battery, the portions of the clamp sections remote from said pivot pin being provided with longitudinally extending recesses, a lever having a portion adjacent one end normally seated in said recesses and pivotally connected to said clamp sections portions for movement from the seated position to a position spreading the clamp sections apart, and spring means urging said clamp sections together about the lever portion when the lever portion is seated in said recesses.

References Cited in the file of this patent

UNITED STATES PATENTS

| 1,472,215 | Goughnour | Oct. 30, 1923 |
| 2,441,420 | Karlin | May 11, 1948 |
| 2,769,964 | Lartz | Nov. 6, 1956 |